(12) United States Patent
Madzgalla

(10) Patent No.: US 12,630,138 B2
(45) Date of Patent: May 19, 2026

(54) ELECTROMECHANICAL ACTUATION UNIT FOR A MOTOR VEHICLE BRAKE

(71) Applicant: ZF Active Safety GmbH, Koblenz (DE)

(72) Inventor: Lukas Madzgalla, Lahnstein (DE)

(73) Assignee: ZF Active Safety GmbH, Koblenz (DE)

( * ) Notice: Subject to any disclaimer, the term of this patent is extended or adjusted under 35 U.S.C. 154(b) by 867 days.

(21) Appl. No.: 17/704,725

(22) Filed: Mar. 25, 2022

(65) Prior Publication Data

US 2022/0306067 A1 Sep. 29, 2022

(30) Foreign Application Priority Data

Mar. 26, 2021 (DE) .......................... 102021203003.3

(51) Int. Cl.
| | |
|---|---|
| *B60T 13/74* | (2006.01) |
| *B60T 1/06* | (2006.01) |
| *F16D 51/22* | (2006.01) |
| *F16D 65/22* | (2006.01) |
| *F16D 65/56* | (2006.01) |
| *F16D 121/24* | (2012.01) |

(Continued)

(52) U.S. Cl.
CPC ............ *B60T 13/746* (2013.01); *F16D 65/22* (2013.01); *F16D 65/561* (2013.01); *B60T 1/067* (2013.01); *F16D 51/22* (2013.01); *F16D 2121/24* (2013.01); *F16D 2125/40* (2013.01); *F16D 2127/06* (2013.01)

(58) Field of Classification Search
CPC ...... B60T 1/067; B60T 13/741; B60T 13/746;

B60T 13/74; B60T 17/22; F16D 65/22; F16D 65/561; F16D 2121/24; F16D 2125/40; F16D 2127/06; F16D 51/22; F16D 65/183; F16D 13/46; F16D 13/52; F16D 55/226; F16D 2125/36; F16D 2065/1396; F16D 2055/0029; F16D 2127/02; F16H 25/2204; F16H 25/24; F16H 25/2081

USPC ........................................................ 188/325
See application file for complete search history.

(56) References Cited

U.S. PATENT DOCUMENTS

| | | | |
|---|---|---|---|
| 2013/0087422 A1* | 4/2013 | Park ........................ | F16D 65/22 188/325 |
| 2016/0025171 A1* | 1/2016 | Choi ....................... | F16D 51/30 188/325 |

(Continued)

FOREIGN PATENT DOCUMENTS

| | | |
|---|---|---|
| DE | 69613600 T2 | 5/2002 |
| DE | 102005021767 A1 | 9/2006 |

(Continued)

*Primary Examiner* — Robert A. Siconolfi
*Assistant Examiner* — San M Aung
(74) *Attorney, Agent, or Firm* — Kristin L. Murphy

(57) ABSTRACT

The present disclosure relates to an electromechanical actuation unit for a motor vehicle brake comprising: at least one electromechanical actuation device for actuating at least one brake shoe of the motor vehicle brake. The electromechanical actuation device has at least drive element and at least one drive spindle, wherein the at least one drive element drives the at least one drive spindle. The electromechanical actuation device has at least one elastic element, the at least one elastic element being elastically deformable for a parking brake function.

15 Claims, 13 Drawing Sheets

(51) Int. Cl.
    *F16D 125/40*     (2012.01)
    *F16D 127/06*     (2012.01)

(56)             References Cited

U.S. PATENT DOCUMENTS

| | | | | |
|---|---|---|---|---|
| 2020/0049215 | A1* | 2/2020 | Song | F16D 65/18 |
| 2020/0055505 | A1* | 2/2020 | Choi | H02K 7/1166 |
| 2020/0263749 | A1* | 8/2020 | Jo | F16D 65/22 |
| 2020/0278000 | A1* | 9/2020 | Hagiwara | B60T 13/74 |
| 2021/0079969 | A1* | 3/2021 | Jo | F16H 25/20 |

FOREIGN PATENT DOCUMENTS

| | | | |
|---|---|---|---|
| DE | 60222989 | T2 | 7/2008 |
| DE | 102010040426 | A1 | 4/2011 |
| DE | 102012019972 | A1 | 4/2013 |
| DE | 102017214938 | A1 | 3/2018 |
| DE | 102017008196 | A1 | 2/2019 |
| DE | 202020105157 | U1 | 9/2020 |
| WO | 2000037819 | A1 | 6/2000 |

* cited by examiner

ELECTROMECHANICAL ACTUATION UNIT FOR A MOTOR VEHICLE BRAKE

CROSS-REFERENCE TO RELATED APPLICATION

This application claims priority to German Priority Application No. 102021203003.3, filed Mar. 26, 2021, the disclosure of which is incorporated herein by reference in its entirety.

TECHNICAL FIELD

The present disclosure relates to an electromechanical actuation unit for a motor vehicle brake, and in one particular arrangement, a drum brake. The present disclosure also relates to an electromechanically actuatable drum brake having such an actuation unit.

BACKGROUND

Motor vehicle brakes and drum brakes are known from the prior art and are disclosed, for example, in the documents WO 2000/37819 A1 and DE 10 2017 08 196 A1.

SUMMARY

What is need, however, is an electromechanical actuation unit for a motor vehicle brake which provides a parking brake function, permits rapid actuation during a service braking process and takes up little installation space.

An electromechanical actuation unit for a motor vehicle brake is proposed herein to improve upon prior art arrangements.

In one exemplary arrangement, an electromechanical actuation unit for a motor vehicle brake, such as, for example, for a drum brake, comprises:

at least one electromechanical actuation device for actuating at least one brake shoe of a motor vehicle brake, the electromechanical actuation device having at least one drive element and at least one drive spindle, the at least one drive element driving the at least one drive spindle, the electromechanical actuation device having at least one elastic element, the at least one elastic element being elastically deformable for a parking brake function.

The parking brake function of the actuation unit can be activated by elastic deformation of the at least one elastic element. Since service braking processes with the motor vehicle brake can be carried out independently of the parking brake function with the actuation unit according to the disclosure, the actuation unit can be actuated quickly and reliably during service braking processes. The electromechanical actuation unit can thus have two functions, a service brake function on the one hand and a parking brake function on the other, which parking brake function can be activated by the elastic deformation of the at least one elastic element.

The at least one actuation device can be designed such that the elastic deformation of the at least one elastic element allows mechanical locking of the at least one actuation device. Permanent maintenance of the parking brake function can be ensured by the mechanical locking of the actuation device in the parking brake function.

The at least one actuation device can be designed such that a relative displacement between the at least one drive element and the at least one drive spindle is possible with elastic deformation of the at least one elastic element. The relative displacement can be a relative rotation or an axial relative displacement. For example, the drive element can be rotated relative to the drive spindle with elastic deformation of the elastic element in order to activate the parking brake function. Furthermore, it is also possible for a drive spindle to be displaceable in the axial direction relative to the drive element with elastic deformation of the elastic element in order to implement the parking brake function.

The at least one actuation device can have at least one coupling element which interacts with the elastic element for coupling the at least one drive spindle to the at least one drive element. The at least one drive spindle can have at least one depression for the at least one coupling element. The at least one drive element can have at least one opening for receiving the at least one coupling element. The at least one elastic element can press the coupling element received in the at least one opening of the drive element into the depression in the drive spindle. The at least one elastic element can extend at least in portions radially on the outside around the at least one drive element. The elastic element can contact the at least one coupling element and press it in the radial direction into the at least one depression in the drive spindle. The at least one coupling element can be a ball, for example. A plurality of coupling elements and, accordingly, a plurality of openings in the drive element and depressions in the at least one drive spindle can also be provided.

The at least one actuation device can have at least one stop element which has at least one externally threaded portion. The externally threaded portion on the at least one stop element can interact with an internally threaded portion on the housing of the actuation device. The thread of the externally threaded portion and the internally threaded portion can be self-locking. A starting position of brake shoes of the drum brake can be set via the position of the at least one stop element. The wear on brake linings can be compensated for by the at least one stop element. The at least one stop element and the at least one drive element can be coupled for the wear composition. If the actuation paths exceed a predetermined amount, the drive element and the stop element can be coupled in such a way that the at least one drive element can contact and rotate the at least one stop element. As a result of this rotation, the at least one stop element is moved outward in the axial direction, as a result of which the starting position of the brake shoes can be readjusted and the wear on the brake linings can be compensated for.

During a service braking process, the at least one drive element can be displaced, in particular rotated, relative to the at least one stop element, the drive element not making contact with the at least one stop element during a service braking process. For the parking brake function, the drive element can contact the at least one stop element and rotate for mechanical locking of the actuation device, and be able to move the at least one stop element axially outward.

The at least one stop element can have at least one recess in which at least one projection is arranged on the at least one drive element. The projection can have a predetermined distance from the wall of the at least one recess. The at least one projection can contact the wall of the recess for the parking brake function and when compensating for the wear on the brake linings.

The at least one drive spindle can extend at least in portions in the at least one drive element. The at least one drive spindle can extend through an opening in the at least one drive element.

The at least one actuation device can have at least one first drive spindle and at least one second drive spindle. The at least one elastic element can preload the drive spindles into their starting position. The at least one elastic element can extend between the first drive spindle and the second drive spindle.

The at least one first drive spindle and the second drive spindle can be coupled to the at least one drive element via a toothing so as to be rotationally fixed and displaceable in the axial direction. The at least one drive element can have at least one opening with a toothing. The drive spindles can each have a toothed portion which engages with the toothing of the openings of the drive element.

The at least one first drive spindle and the second drive spindle can be supported in the axial direction on the drive element. The first and second drive spindles can each have at least one contact portion. The contact portion can have at least one radial projection. With the at least one contact portion, the drive spindles can be supported on the drive element in the axial direction. The at least one elastic element can preload the contact portions of the drive spindles into contact with the drive element. The contact portions and/or the at least one elastic element can be received in a recess in the at least one drive element. With compression of the at least one elastic element, the contact portions of the drive spindles can move toward one another in the recess of the drive element.

The at least one first drive spindle and the second drive spindle can each have at least one axial projection. The axial projections can be brought into contact with one another while compressing the at least one elastic element. The axial projections can contribute to the mechanical locking of the actuation device.

The at least one actuation device can have at least one actuating nut which can be displaced in the axial direction by the at least one drive spindle. If the actuation device has a drive spindle, at least two actuating nuts can be assigned to this drive spindle. The drive spindle can have two opposite-handed threaded portions in order to be able to move the actuating nuts in the axial direction for actuating the motor vehicle brake, in one exemplary arrangement, a drum brake, outward and inward to release the brake. If the actuation device has a first drive spindle and a second drive spindle, an actuating nut can be assigned to each drive spindle.

The actuation unit can have at least one electric motor. The at least one electric motor can have an axis of rotation that extends parallel to the actuation axis of the actuation device. The actuation unit can have at least one transmission which couples the actuation device to the electric motor. The transmission can be coupled to the at least one drive element. For this purpose, the drive element can have at least one gear wheel portion.

The actuation unit can have at least one housing. The at least one actuation device, the at least electric motor and the at least one transmission can be accommodated at least in portions in the at least one housing.

The present disclosure further relates to an electromechanically actuatable drum brake having at least one electromechanical actuation unit of the type described above. The drum brake has at least one brake drum and at least two brake shoes which can be actuated by the at least one electromechanical actuation unit. The advantage of the actuation unit according to the disclosure lies in the compact design, which is useful when it is installed in a drum brake, since the space available in the drum is very limited.

The drum brake can have at least one anchor plate. The at least one anchor plate can be attached to a wheel axle. At least the electric motor can be arranged on a side of the anchor plate facing away from the brake drum. The anchor plate can have an opening through which the actuation unit can extend. In other words, the at least one electric motor is arranged outside the brake drum. As a result, the electric motor can be protected from the heat inside the brake drum.

BRIEF DESCRIPTION OF DRAWINGS

Exemplary arrangements of the disclosure are described below with reference to the accompanying figures, in which.

DETAILED DESCRIPTION

Figure 1:
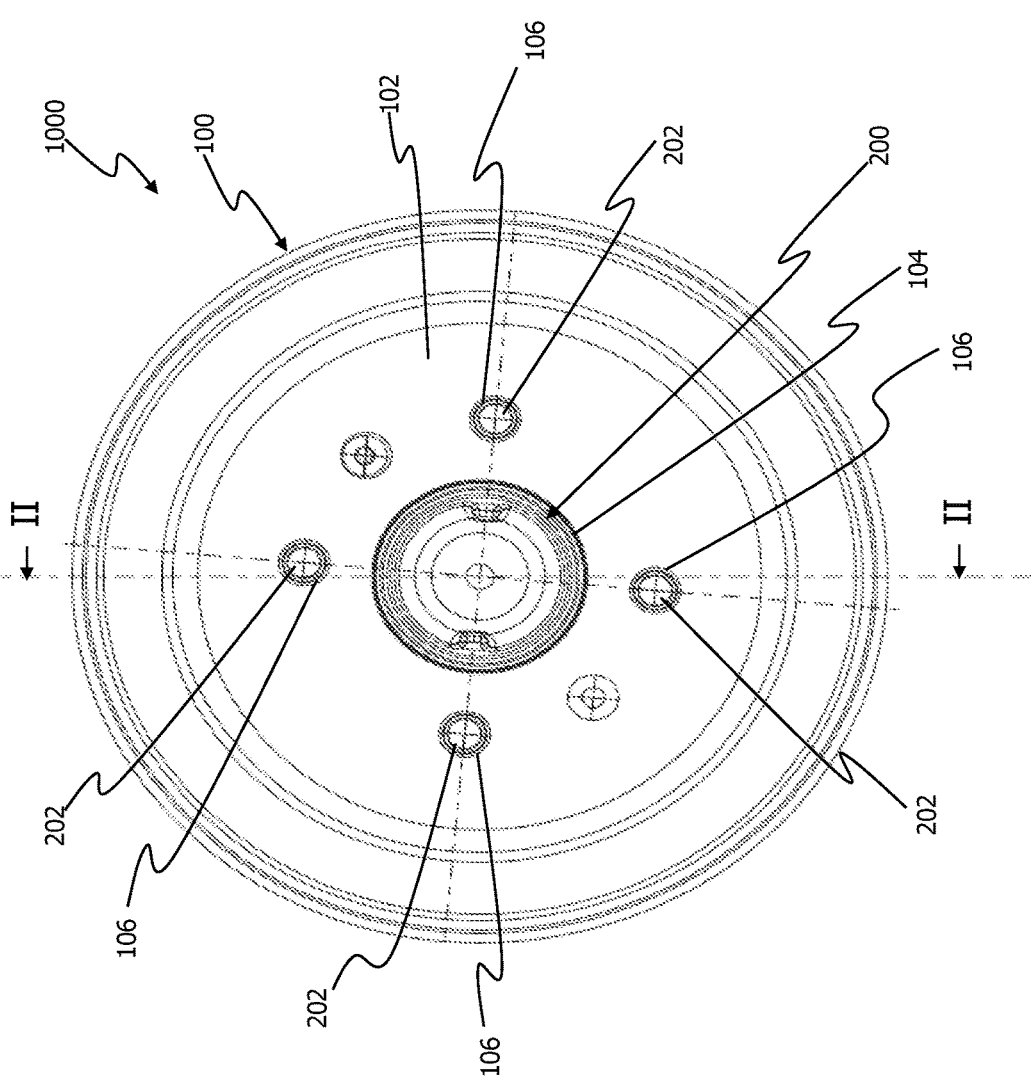
FIG. 1 is a plan view of a drum brake according to the disclosure.

FIG. 1 is a plan view of an exemplary drum brake 1000. The drum brake 1000 has a brake drum 100. The brake drum 100 has a wheel contact surface 102 on which a vehicle wheel (not shown) comes to rest. The brake drum 100 is connected to a wheel axle 200. The wheel axle 200 extends in portions through an opening 104 in the brake drum 100. Fastening bolts 202 are provided on the wheel axle 200 and extend through openings 106 in the brake drum 100. A vehicle wheel can be fastened to the wheel axle 200 via the fastening bolts 202 and can be brought into contact with the brake drum 100. As an alternative to the wheel bolts 202, openings can also be provided on the wheel axle 200, into which openings fastening elements for the vehicle wheel can be inserted.

Figure 2:
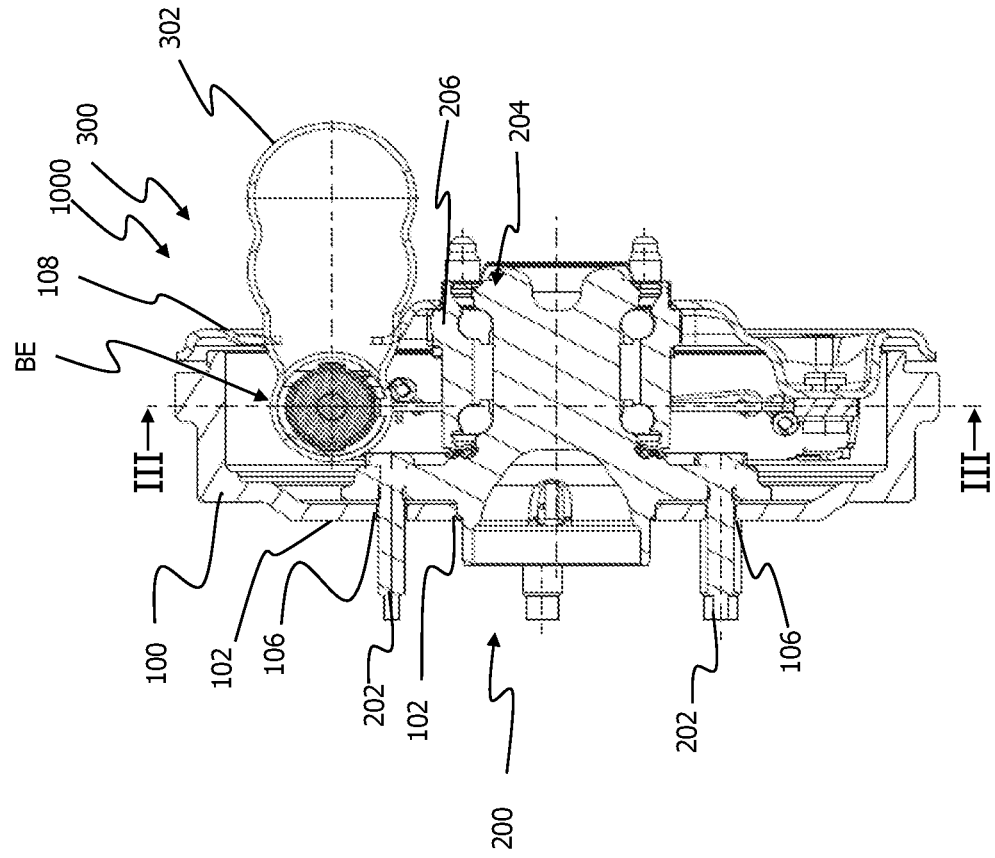
FIG. 2 is a sectional view along the section line II-II in FIG. 1.

FIG. 2 is a sectional view along the section line II-II in FIG. 1. The brake drum 100 is attached to the wheel axle 200. The brake drum 100 is connected to the wheel axle 200 via the fastening bolts 202 so as to be rotationally fixed. The brake drum 100 can thus rotate with the wheel axle 200. The wheel axle 200 is rotatably mounted via a wheel bearing 204. The wheel bearing 204 has a bearing housing 206. An anchor plate 108 of the drum brake 1000 is attached to the bearing housing 206. The anchor plate 108 forms a housing part of the drum brake 1000.

The drum brake 1000 has an electromechanical actuation unit 300. The actuation unit 300 is supported by the anchor plate 108. The electromechanical actuation unit 300 comprises an actuation device BE and a transmission, not shown in FIG. 2, which is arranged in a transmission housing 302. The transmission housing 302 adjoins the actuation device BE, which is also accommodated in a housing. The transmission is arranged outside the brake drum 200 and the actuation device BE is arranged inside the brake drum 100.

Figure 3:
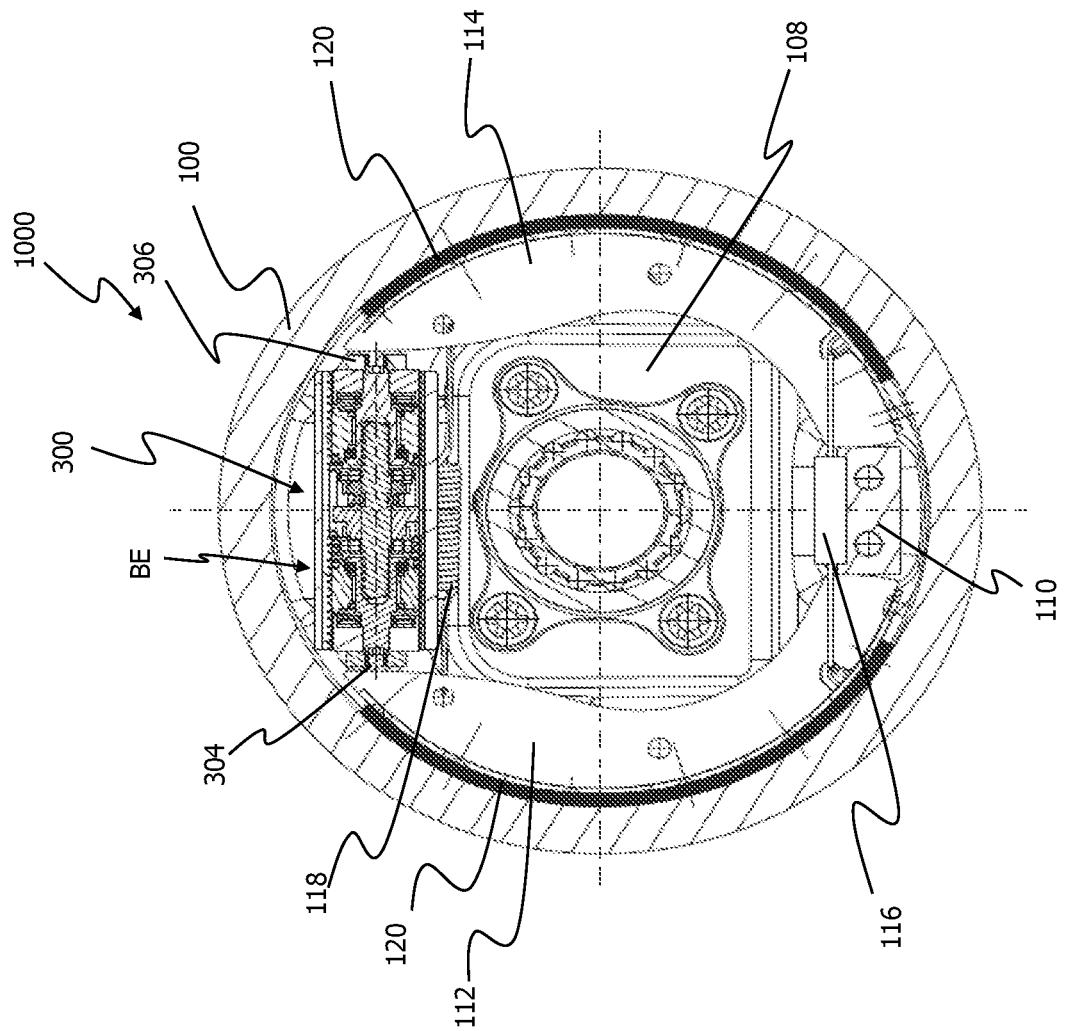
FIG. 3 is a sectional view along the section line III-III in FIG. 2.

FIG. 3 is a sectional view along the section line III-III in FIG. 2. A contact plate 110 is attached to the anchor plate 108. The brake shoes 112 and 114 rest on the contact plate 110. The brake shoes 112 and 114 are held in contact with the contact plate 110 by a spring 116. A return spring 118 preloads the brake shoes 112 and 114 into their starting position and into their non-actuated position, respectively. The spring 116 and the return spring 118 can be tension springs, for example. The return spring 118 extends near the actuation device BE between the brake shoes 112 and 114. The return spring 118 extends below the actuation device BE. The spring 116 and the return spring 118 are correspondingly coupled to the two brake shoes 112 and 114. The brake shoes 112 and 114 rest with one end on the contact plate 110 and with the other end on the actuation device BE. The actuation device BE has actuation elements 304 and 306 against which the brake shoes 112 and 114 rest. The actuation unit 300 is coupled to brake shoes 112 and 114. Friction linings 120 are attached to the brake shoes 112 and 114. The friction linings 120 can be brought into contact with the inner peripheral surface of the brake drum 100 via the actuation unit 300 and the brake shoes 112 and 114 in order to generate a braking effect.

Figure 4:
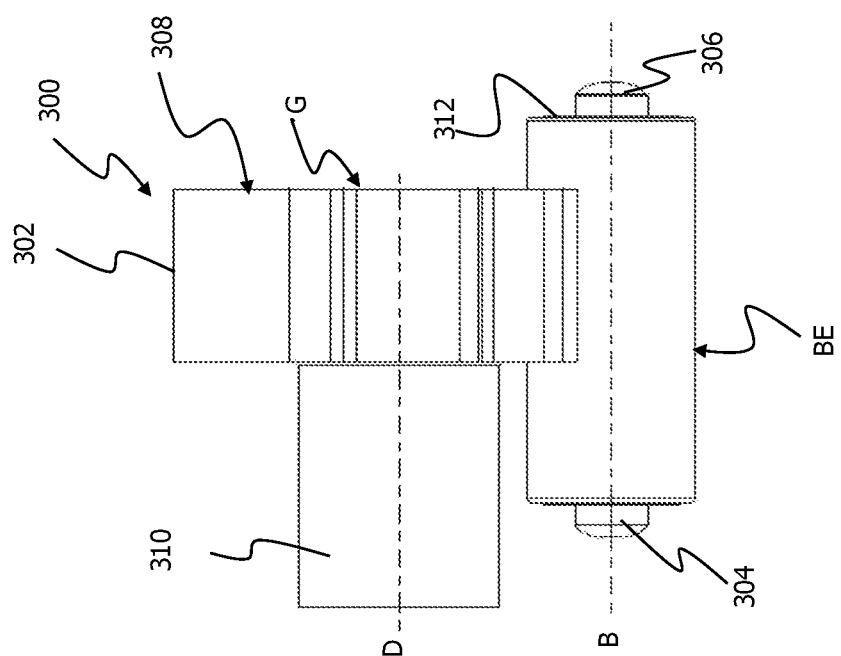

FIG. 4 is a view of the electromechanical actuation unit 300. The actuation unit 300 comprises the actuation device BE, a transmission 308 and an electric motor 310. The electromechanical actuation device BE has a housing 312. The actuation elements 304 and 306 of the actuation device BE can be seen on the sides of the housing 312. The transmission 308 is arranged in the transmission housing 302, which is connected to the housing 312 of the actuation device BE. The transmission housing 302 extends around the outside of the housing 312 of the actuation device BE and thus forms a main housing G. The electric motor 310 is attached to the main housing G. The transmission 308 is coupled to the actuation device BE. The transmission 308 is coupled to the electric motor 310. The torque generated by the electric motor 310 is transmitted to the actuation device BE via the transmission 308. In the actuation device BE, the rotational movement is converted into a translational movement of the actuation elements 304 and 306 in order to actuate the brake shoes 112 and 114 (see FIG. 3).

The axis of rotation D of the electric motor 310 is arranged parallel to the actuation axis B of the actuation elements 304 and 306. A drive shaft (not shown) of the electric motor 310 extends into the transmission housing 302 in order to be able to drive the transmission 308. The electric motor 310 is attached to the gear housing 302.

Figure 5:
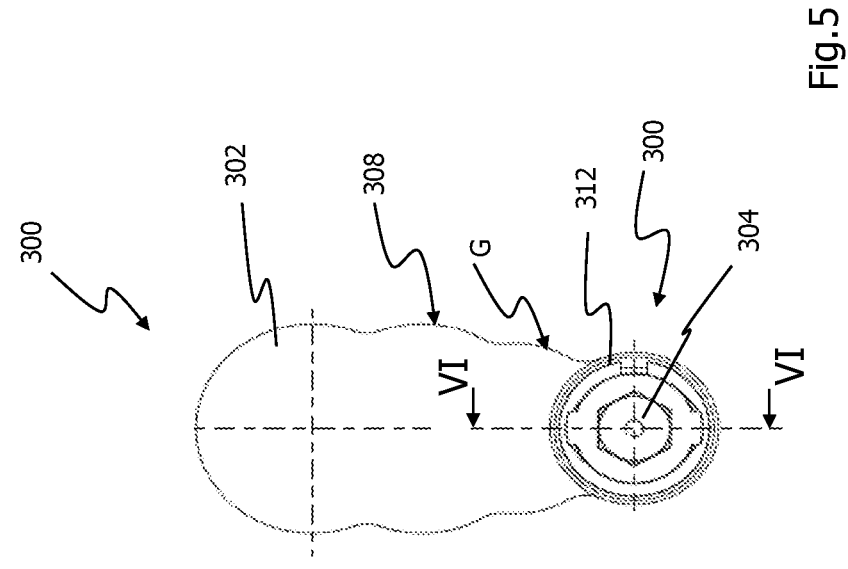
FIGS. 4 and 5 are views of an actuation unit according to a first exemplary arrangement.

FIG. 5 is a plan view of the actuation device BE and the transmission housing 302. The transmission housing 302 extends in portions around the housing 312 of the actuation device BE. As a result, the transmission housing 302 forms the main housing G of the actuation unit 300. The housing 312 of the actuation device BE is cylindrical at least in portions.

Figure 6:
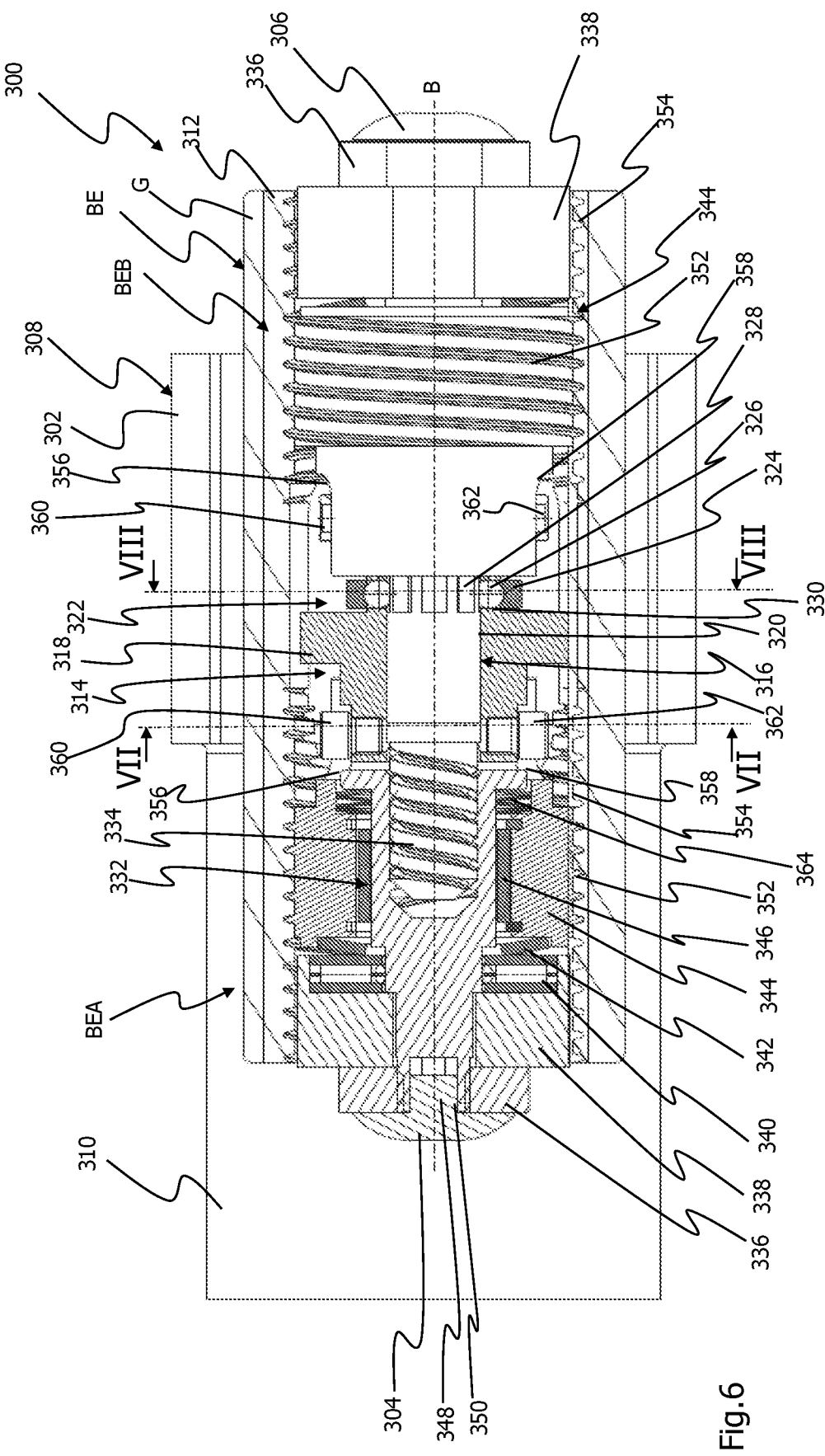
FIG. 6 is a partial sectional view along the section line VI-VI in FIG. 5.

FIG. 6 is a partial sectional view of the actuation unit 300 along the section line VI-VI in FIG. 5. The following description focuses on the actuation portion BEA of the actuation device BE of the actuation device BE shown in section, the actuation portion BEB not shown in section in FIG. 6 being identical to the actuation portion BEA.

The actuation device BE has a drive element 314 and a drive spindle 316. The drive element 314 has a gearwheel portion 318 that is coupled to the transmission 308. The drive spindle 316 extends through an opening 320 in the drive element 314. The drive element 314 is coupled to the drive spindle 316 via a coupling device 322. The actuation device BE has the two actuation portions BEA and BEB, which can be actuated via the drive element 314 and the drive spindle 316. The two actuation portions BEA and BEB are identical, the drive spindle 316 being designed such that the two actuation portions BEA and BEB can be moved outward via the drive spindle 316 along the axis B for brake actuation or inward for transferring to a starting position. As already mentioned above, the following description focuses on the actuation portion BEA, which is shown in section in FIG. 6.

The actuation device BE has a coupling device 322 which couples the drive spindle 316 to the drive element 314. The coupling device 322 has an elastic element 324 and balls 326. The drive spindle 316 has depressions 328. Openings 330 are formed in the drive element 314. The balls 326 are received in the openings 330 and are held in the depressions 328 in the drive spindle 316 via the elastic element 324. The elastic element 324 extends radially outwardly around the openings 330 in the drive element 314 and the balls 326. In other words, the balls 326 are pressed into the depressions 328 in the drive spindle 316 via the elastic element 324, i.e. the balls 326 are pressed radially inward. This produces a torque-transmitting coupling between the drive element 314 and the drive spindle 316.

The actuation device BE has an actuation nut 332 which engages with a threaded portion 334 on the drive spindle 316. The actuating nut 332 is connected to the actuation element 304. The actuation element 304 is in contact with a spacer ring 336. The spacer ring 336 rests against a retaining ring 338 which holds an axial bearing 340. A spring element 342 is supported on the axial bearing 340. The spring element 342 can be a disk spring. The spring element 342 holds the axial bearing 340 in contact with a stop element 344. The stop element 344 is rotatably mounted on the actuating nut 332 via a bearing 346. The actuating nut 332 extends through the stop element 344 or through the bearing 346, the spring element 342, the axial bearing 340, the retaining ring 338 and the spacer ring 336 to the actuation element 304. The actuation element 304 has a fastening projection 348 which is received in an opening 350 in the actuating nut 332. The opening 350 is formed in an end face of the actuating nut 332. The actuation nut 332 is stepped in order to ensure that the actuation element 304, the spacer ring 336, the retaining ring 338 and the axial bearing 340 can be moved along the actuation axis B or in the axial direction when actuated together with the actuating nut 332.

The stop element 344 has an externally threaded portion 352. The housing 312 of the actuation device BE has an internally threaded portion 354. The externally threaded portion 352 engages with the internally threaded portion 354. The thread of the internally threaded portion 354 and the externally threaded portion 352 is self-locking. The stop element 344 can thus maintain its axial position even when axial forces act on the stop element 344. The stop element 344 has recesses or cavities 356 and 358. The recesses or cavities 356 and 358 extend into the stop element 344 starting from an axial end. Projections 360, 362, which are provided on the drive element 314, are arranged in these cavities 356, 358. According to this exemplary arrangement, the projections 360 and 362 are designed as bolts that are connected to the drive element 314. The projections 360 and 362 protrude in the radial direction from the drive element 314.

The projections 360, 362 do not contact the walls of the cavities 356, 358 during service braking operation. If the wear of the brake linings 120 exceeds a predetermined amount, the drive element 314 is coupled to the stop element 344 via the projections 360, 362 and can move this stop element outward in the axial direction in order to set a new starting position for the brake shoes 112, 114. In this way, the wear on the brake linings 120 can be compensated for.

At the end facing the drive element 314, the actuating nut 332 has a radially outwardly protruding projection. This projection can be formed circumferentially. A return spring 364 is supported on this projection. The return spring 364 is supported at its other end on the stop element 344. The return spring 364 serves to return the actuating nut 332 to its starting position after a brake actuation.

Figure 7:
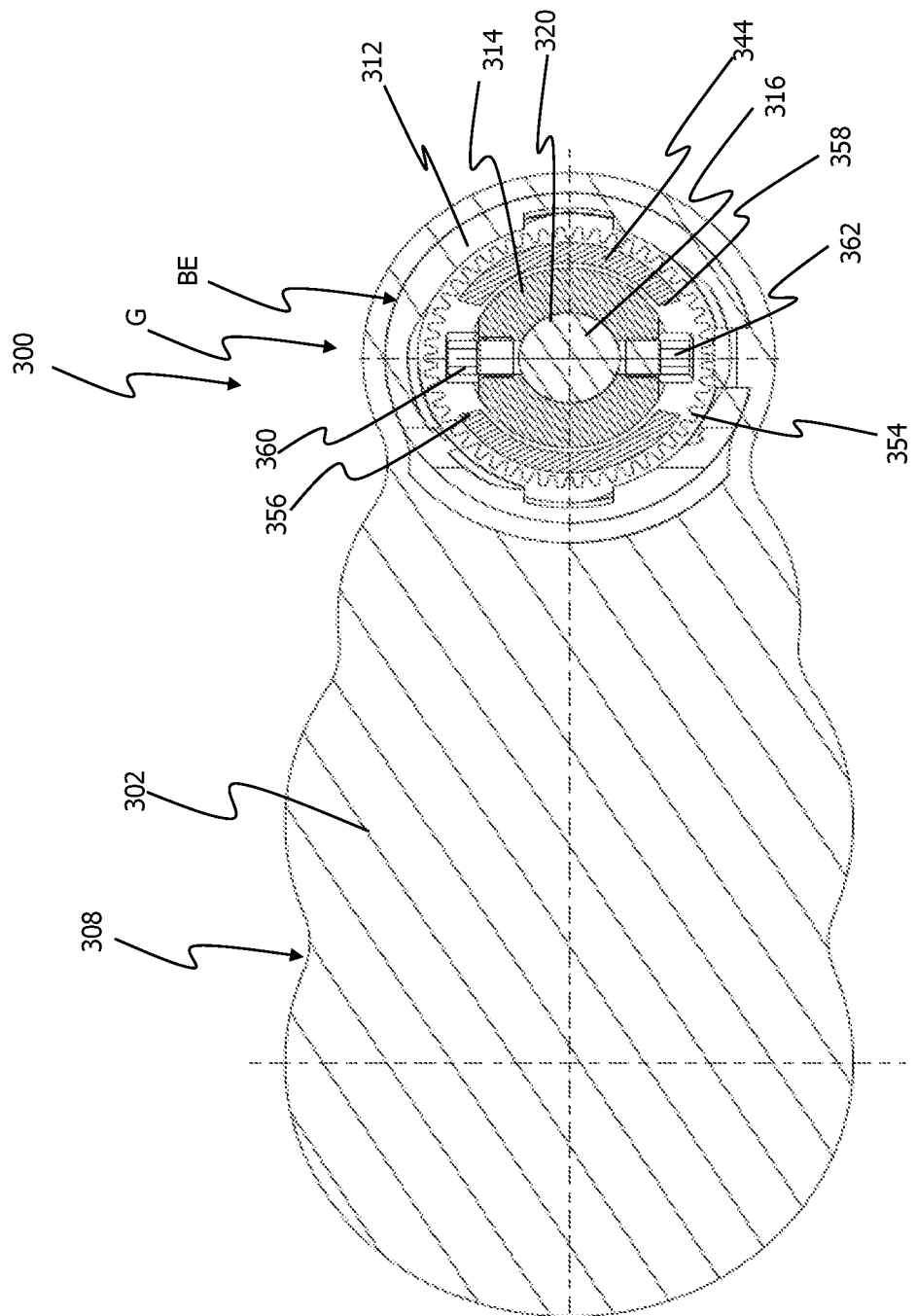
FIG. 7 is a sectional view along the section line VII-VII in FIG. 6.

FIG. 7 is a sectional view along the section line VII-VII in FIG. 6. The actuation device BE and the transmission 308 are shown in FIG. 7. The transmission housing 302 can surround the housing 312 of the actuation device BE in portions and forms the main housing G. The internally threaded portion 354 is formed on an inner circumference of the housing 312 of the actuation device BE.

The drive spindle 316 extends through an opening 320 in the drive element 314. Starting from the drive element 314, the projections 360 and 362 extend radially outward. The projections 360 and 362 are formed by bolts that can be screwed into openings in the drive element 314. The projections 360 and 362 extend into the cavities 356 and 358 of the stop element 344. The cavities 356, 358 have a predetermined extent in the peripheral direction. The cavities 356 and 358 are dimensioned such that the projections 360 and 362 do not come into contact with the walls of the cavities 356 and 358 during a service braking operation.

Figure 8:
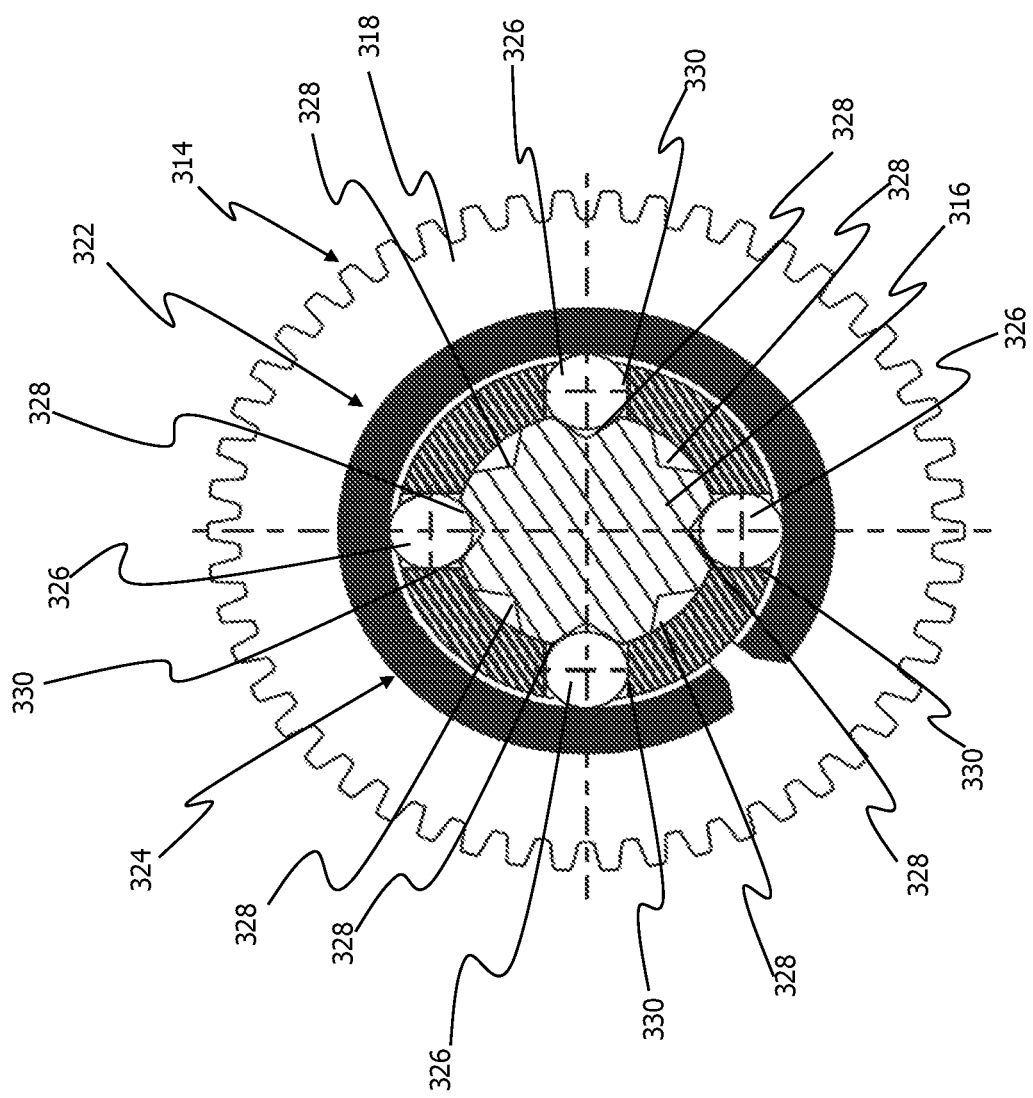
FIG. 8 is a sectional view along the section line VIII-VIII in FIG. 6.

FIG. 8 is a sectional view of the coupling device 322 along the section line VIII-VIII in FIG. 6. The coupling device 322 comprises the elastic element 324, the balls 326, the depressions 328 in the drive spindle 316 and the openings 330 in the drive element 314. The elastic element 324 can be, for example, an annular spring. The elastic element 324 contacts the balls 326. The balls 326 are received in the openings 330 of the drive element 314. The balls 326 rest in the depressions or recesses 328 on the drive spindle 316. The elastic element 324 presses the balls 326 into the recesses 328 of the drive spindle 316. The drive element 314 is thereby coupled to the drive spindle 316. The balls 326 are received in the openings 330 of the drive element 314 so as to be displaceable in the radial direction with elastic deformation of the elastic element 324.

Furthermore, FIG. 8 shows the gearwheel portion 318 of the drive element 314, which has a toothing on its outer circumference which can be coupled to the transmission (not shown).

Figure 9:
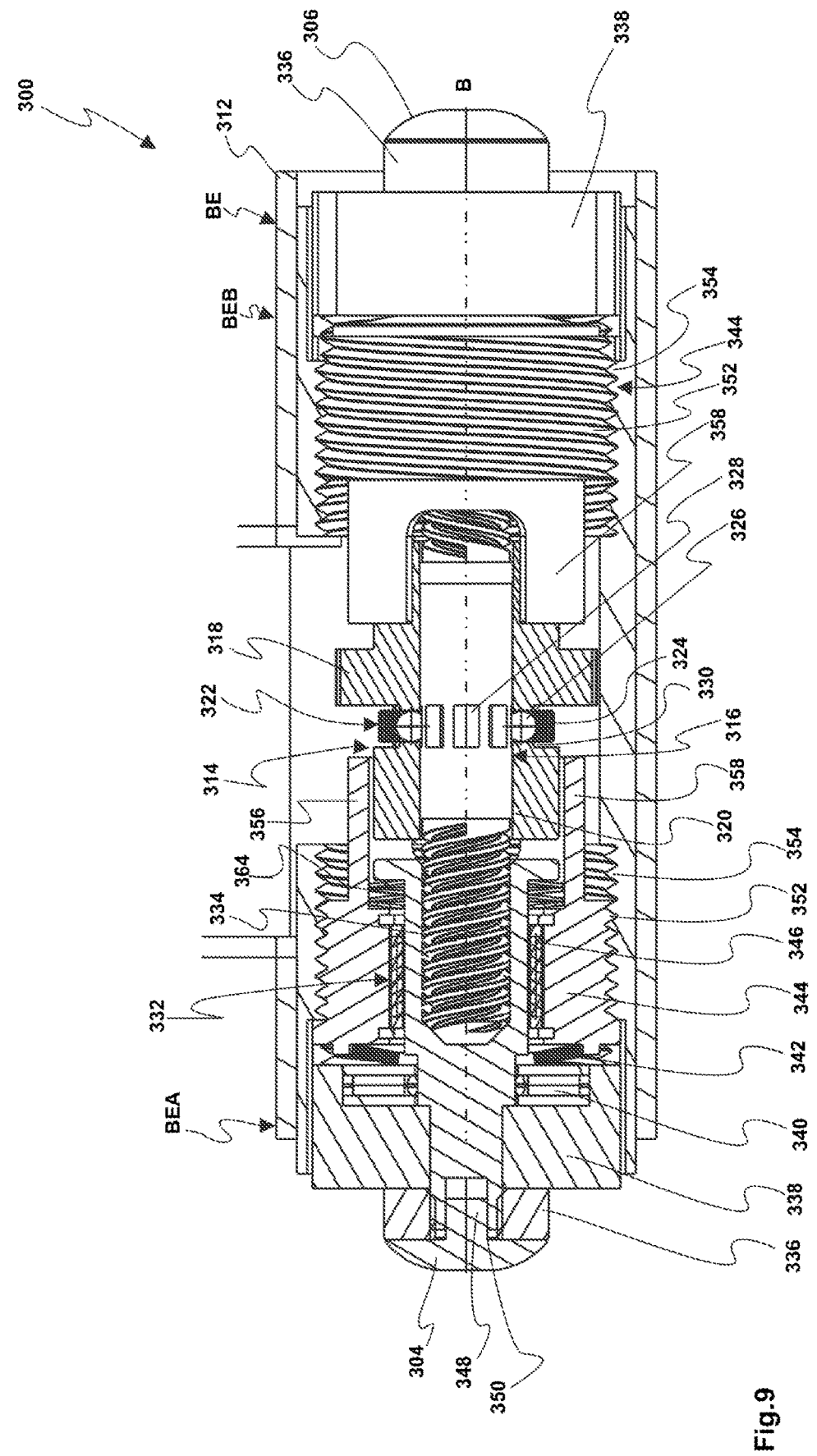
FIG. 9 is a further partial sectional view of the actuation unit with the position of the drive element and the drive spindle changed.

FIG. 9 is a further sectional view of the actuation device BE, the actuation device BE being shown in a different actuating state than in FIG. 6. This can be seen from the drive element 314. In the right operating portion BEB, the cavities 356 are shown, in which the projection 360 is located in a central position. During normal service braking, the projection 360 can migrate within the cavity 356 without hitting the walls of the cavity 356. The stop element 344 remains stationary in its set position, whereas the actuation element 306, the spacer ring 336, the retaining ring 338 together with the actuating nut 332 move outward in the axial direction.

Figure 10:
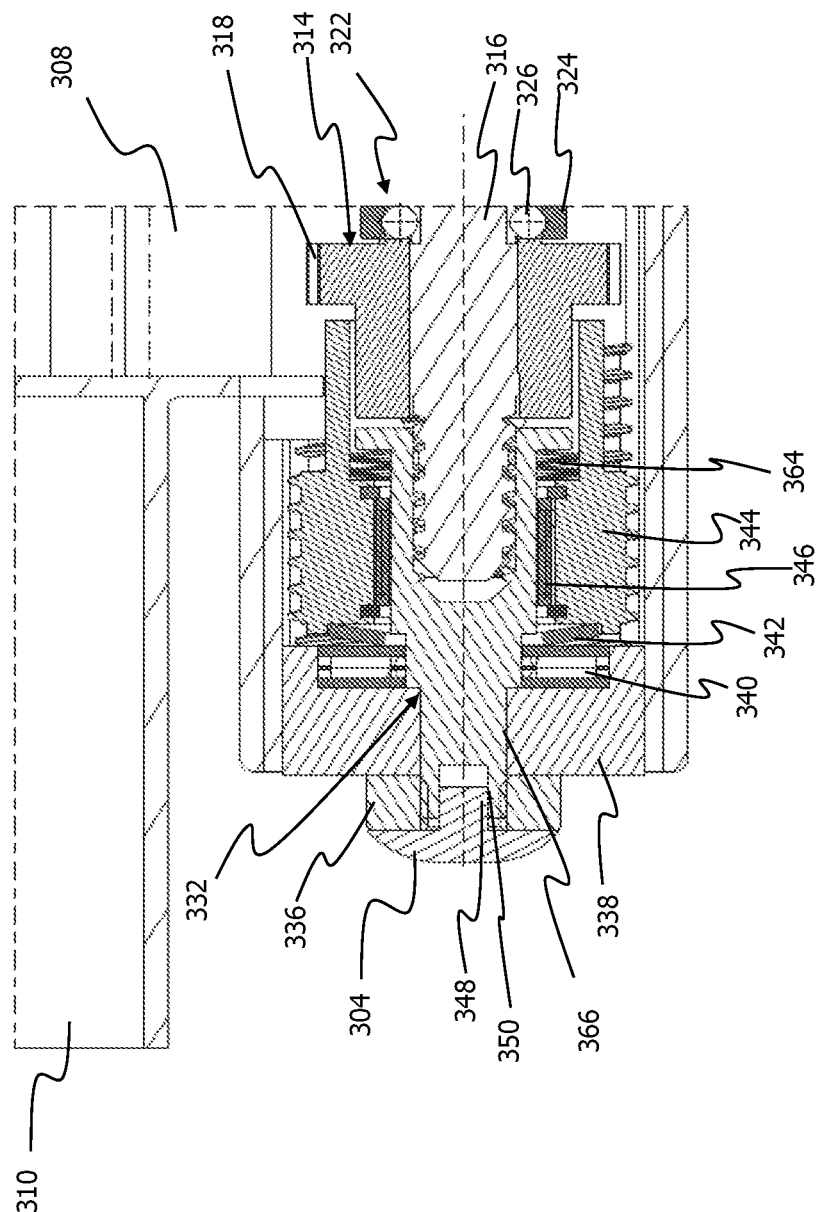
FIG. 10 is a further partial sectional view of the actuation unit.

FIG. 10 is a further partial sectional view of the actuation unit 300. The actuation element 304 can be screwed to the actuating nut 332 via its fastening projection 348. The actuating nut 332 can be secured against twisting. For this purpose, the actuating nut 332 can interact with the retaining ring 338 and the housing 312. The actuating nut 332 has a predetermined cross section at its end portion 366 to prevent rotation.

Figure 11:
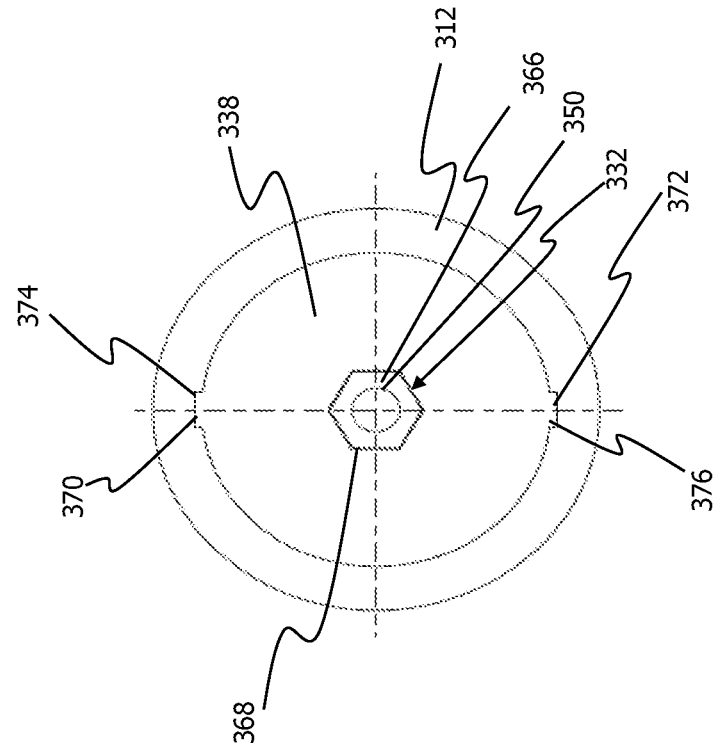
FIG. 11 is a plan view of the actuation unit.

FIG. 11 is a plan view of the actuation device BE. The actuating nut 332 has the opening 350 on an end face of an end portion 366, which opening is used to fasten the actuation element 302. In one exemplary arrangement, the end portion 366 of the actuating nut 332 has a hexagonal cross section. The retaining ring 338 has an opening 368 with a corresponding, i.e., a hexagonal cross section, which is designed to correspond to the hexagonal cross section of the end portion 336 of the actuating nut 332. On the outer circumference, the retaining ring 338 has two projections 370 and 372 which project in the radial direction. The projections 370 and 372 engage in grooves 374 and 376 on the inner peripheral surface of the housing 312. Rotation of the actuating nut 332 is prevented by the hexagonal cross section of the end portion 366 of the actuating nut 332, the corresponding hexagonal cross section of the opening 368 of the retaining ring 338 and the projections 370 and 372 engaging in the grooves 374 and 376 of the housing 312 on the actuating nut 332. As a result, the translational displacement of the actuating nut 332 along the actuation axis B can be ensured.

During a service braking operation, the drive element 314 is driven by the transmission 308 and the electric motor 310. This rotation of the drive element 314 is transmitted to the drive spindle 316 via the coupling device 322. The drive spindle 316 moves the actuating nuts 332 and thus the actuation elements 304 and 306 outward along the actuation axis B in order to bring the brake shoes 112 and 114 into braking contact with the brake drum 100 (see FIG. 1 to 3). The transfer of the actuating nuts 332 and the actuation elements 304 and 306 takes place in the same way, although the direction of rotation with which the drive element 314 rotates is changed or reversed. The actuating nuts 332 move with the actuation elements 304 and 306 inwardly toward the drive element 314.

For a parking brake function, the electric motor 310 and the transmission 308 provide a higher torque. First, the brake shoes 112 and 114 are brought into contact with the brake drum 100 via the actuating nuts 332 and the actuation elements 304, 306 during a service braking process. Due to the higher torque or the further increased torque of the electric motor 310 with which the drive element 314 is driven, the balls 326 are moved out of the depressions 328 in the drive spindle 316 as the elastic element 324 expands radially. As a result, the drive spindle 316 is decoupled from the drive element 314. The drive element 314 continues to rotate so that the projections 360, 362 come into contact with the wall of the recesses 356, 358 of the stop element 344. As a result, the stop element 344 is moved outward via its threaded connection with the housing 312 until it comes into contact with the retaining ring 338 while compressing the spring element 342 and locks the retaining ring in its position. Since the thread of the stop element 344 and of the housing 312 is self-locking, the actuation unit 300 can be mechanically locked in the manner described above for a parking brake function.

Figure 12:
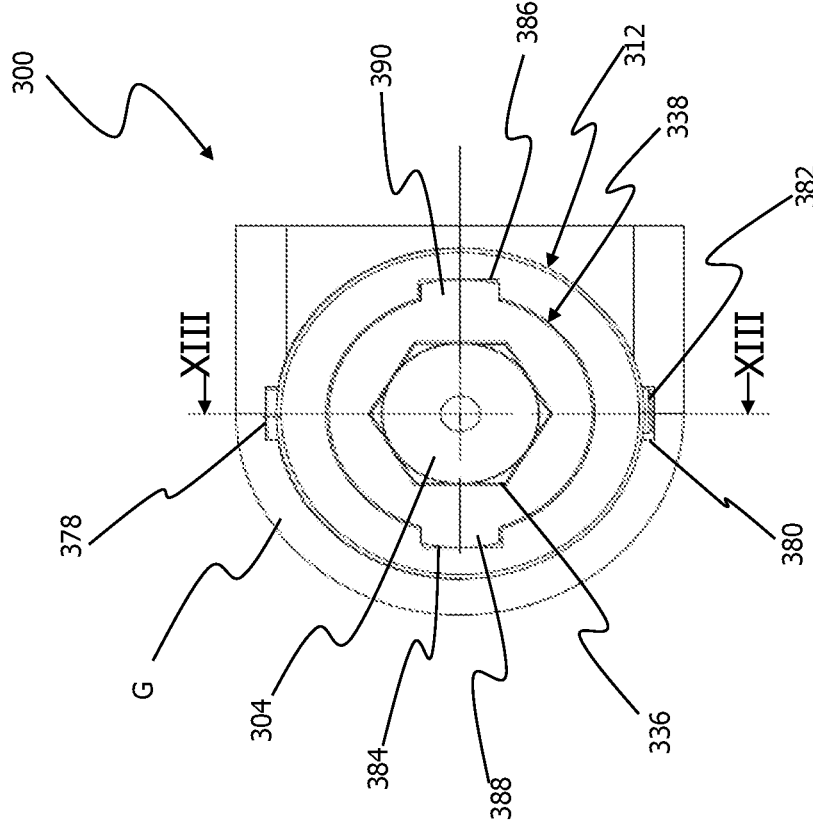
FIG. 12 is a plan view of an actuation unit according to a second exemplary arrangement.

FIG. 12 is a plan view of an actuation unit 300 according to a second exemplary arrangement. The actuation unit 300 has a main housing G in which the housing 312 of the actuation device BE is accommodated. Grooves 378 and 380 are formed in the main housing G. Guide elements 382 on the housing 312 engage in the grooves 378 and 380, so that the housing 312 can be inserted into the main housing G and secured against twisting. Grooves 384, 386 are formed in the housing 312, into which grooves projections 388 and 390 on retaining ring 338 engage. This serves to secure the retaining ring 338 against twisting. Furthermore, the actuation element 304 and the spacer ring 336 are shown in FIG. 12. The spacer ring 336 has a hexagonal cross section.

Figure 13:
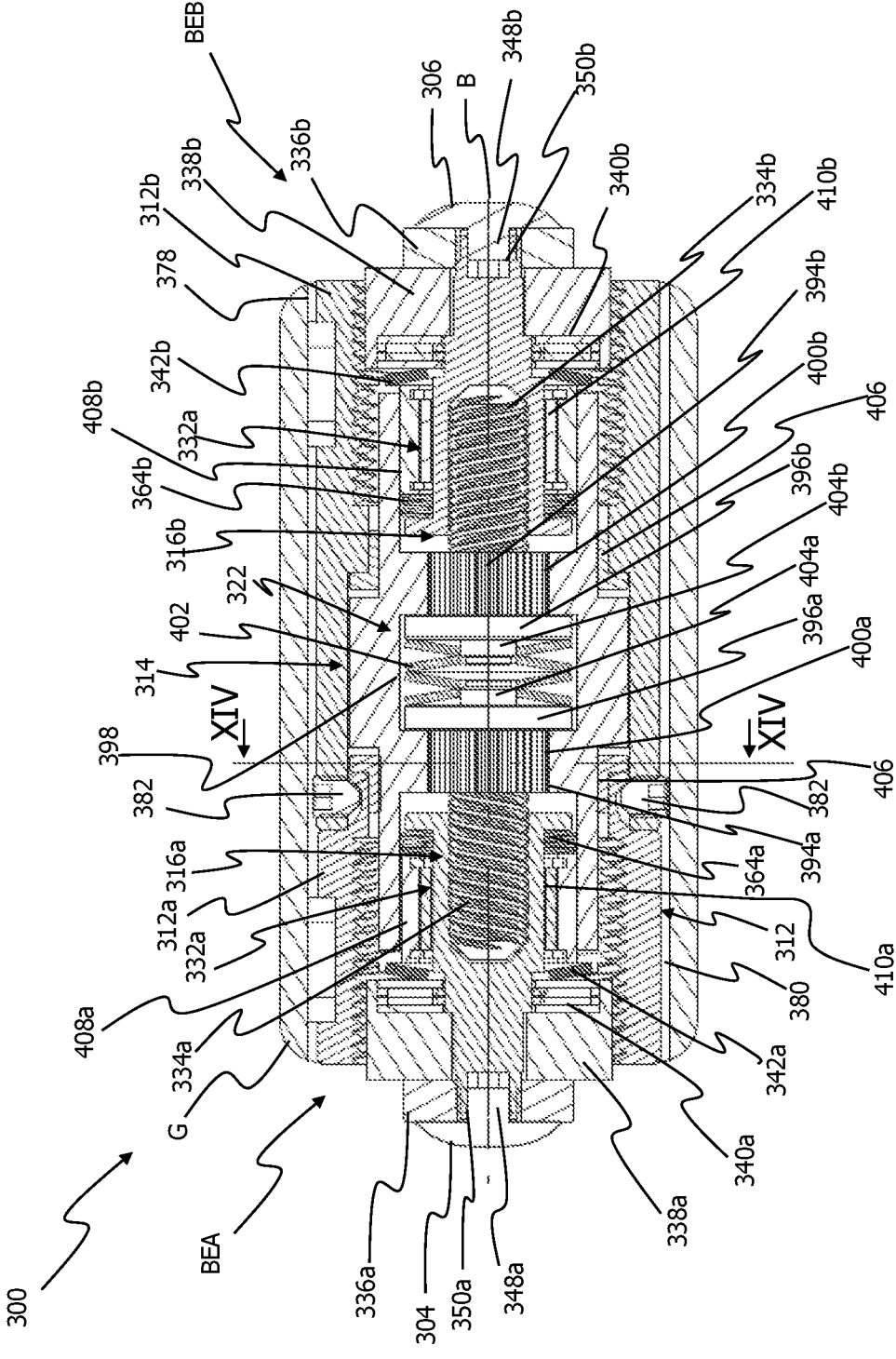
FIG. 13 is a sectional view along the section line XIII-XIII in FIG. 12.

FIG. 13 is a sectional view along the section line XIII-XIII in FIG. 12. The actuation device BE has the two actuation portions BEA and BEB. The following description focuses on the actuation portion BEA, although the explanations also apply to the actuation portion BEB.

The actuation device 300 comprises the main housing G in which the grooves 378 and 380 are formed. The housing 312 of the actuation device BE is accommodated in the main housing G. According to this exemplary arrangement, the housing 312 is designed in two parts and is composed of the housing parts 312a and 312b. The two housing parts 312a and 312b are connected to one another via the guide elements 382. The guide members 382 engage in the grooves 378 and 380 in the main housing G.

The actuation device BE has a drive element 314 and two drive spindles 316a and 316b. The drive spindles 316a and 316b each have a threaded portion 334a, 334b and a toothed portion 394a, 394b. The toothed portions 394a and 394b are received in openings 400a and 400b of the drive element. The openings 400a and 400b have a toothing. The toothing of the openings 400a and 400b is in engagement with the toothed portions 394a and 394b. The toothed portions 394a, 394b are adjoined by a contact portion 396a, 396b of the drive spindles 316a and 316b. The contact portions 396a, 396b are received in a recess 398 in the drive element 314.

The drive spindles 316a and 316b are coupled via an elastic element 402. The elastic element 402 is designed in the form of a disk spring assembly. The elastic element 402 extends in the axial direction between the contact portions 396a and 396b of the drive spindles 316a and 316b. The elastic element 402 preloads the drive spindles 316a and 316b into their starting position in contact with the wall of the recess 398.

Projections 404a and 404b are formed on the contact portions 396a and 396b. The projections 404a and 404b serve to position the elastic element 402. The projections 404a and 404b can be brought into contact with one another while compressing the elastic element 402. The drive element 314 is mounted on the housing 312 via bearing sleeves 406.

The actuation device BE has actuating nuts 332a and 332b which each engage with a threaded portion 334a, 334b on the drive spindle 316a, 316b. The actuating nuts 332a, 332b are connected to the actuation elements 304 and 306. The actuation elements 304, 306 are in contact with spacer rings 336a, 336b. The spacer rings 336a, 336b rest against the retaining rings 338a and 338b, which each retain an axial bearing 340a and 340b. A spring element 342a, 342b is supported on each of the axial bearings 340a, 340b. The spring elements 342a and 342b can be plate springs. The spring elements 342a, 342b hold the axial bearing 340a, 340b in contact with a stop element 408a, 408b which is received in the drive element 314 together with a bearing 410a, 410b. The bearing 410a, 410b is used to allow the drive nuts 332a and 332b to be displaced along the actuation axis B relative to the drive element 314. At the end facing the drive element 314, the actuating nuts 332a and 332b have a radially outwardly protruding projection. This projection can be formed circumferentially. A return spring 364a, 364b is supported on this projection in each case. The return spring 364 is supported at its other end on the stop element 408a, 408b. The return springs 364a, 364b serve to return the actuating nuts 332a, 332b to their starting position after a brake actuation.

The threaded portions 334a, 334b of the drive spindles 316a and 316b are each screwed to one of the actuating nuts 332a and 332b. The thread of the pairing of drive spindle 316a and actuating nut 332a and the thread of the pairing of drive spindle 316b and actuating nut 332b are designed so as to be opposite-handed, so that a rotation of the drive element 314 can move the actuating nuts 332a and 332b in opposite directions along the actuation axis B.

The actuating nuts 332a, 332b extend through the stop element 408a, 408b or through the bearing 410a, 410b, the spring element 342a, 342b, the axial bearing 340a, 340b, the retaining ring 338a, 338b and the spacer ring 336a, 336b to the actuation element 304, 306. The actuation element 304, 306 has a fastening projection 348a, 348b which is received in an opening 350a, 350b in the actuating nut 332a, 332b. The opening 350a, 350b is formed in an end face of the actuating nuts 332a and 332b. The actuating nuts 332a and 332b are stepped, so that the actuation element 304, 306, the spacer ring 336a, 336b, the retaining ring 338a, 338b and the axial bearing 340a, 340b can be moved along the actuation axis B or in the axial direction when actuated together with the relevant actuating nut 332a, 332b.

Figure 14:
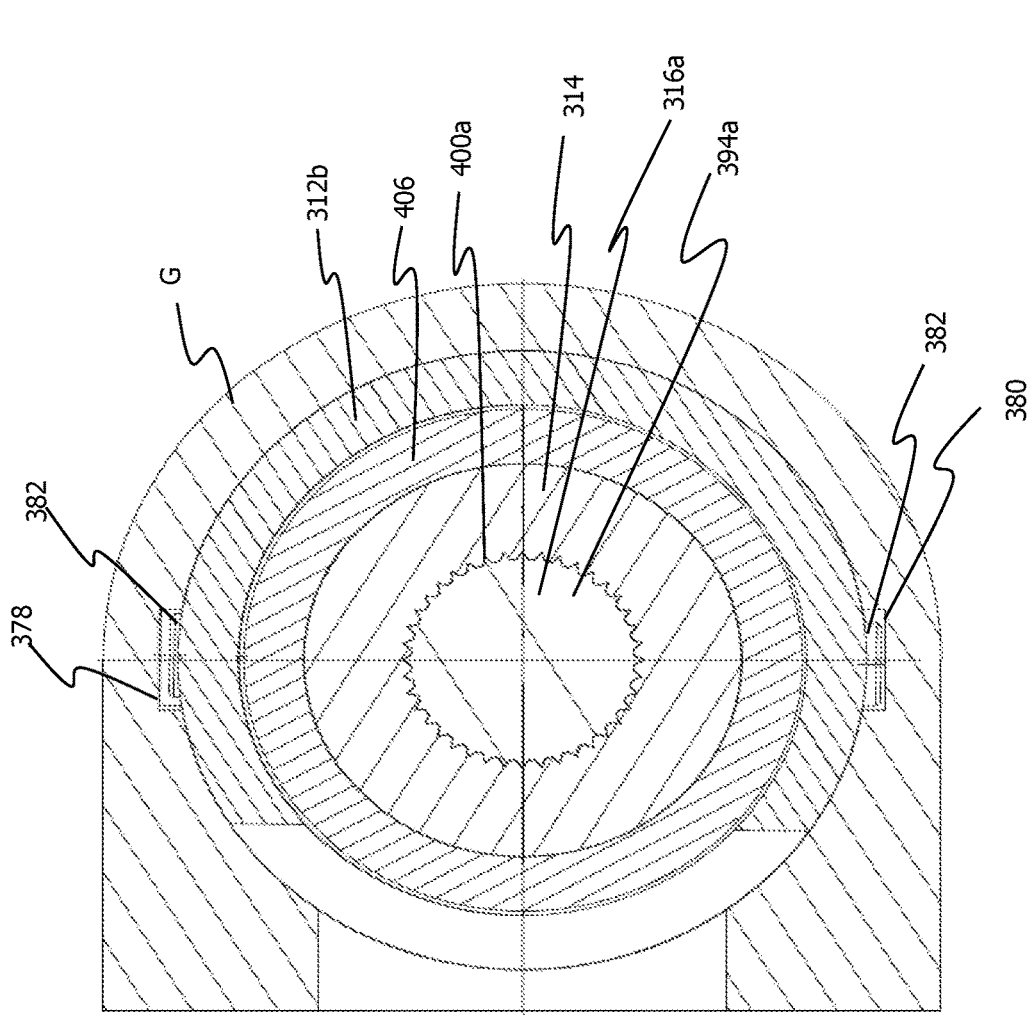
FIG. 14 is a sectional view along the section line XIV-XIV in FIG. 13.

FIG. 14 is a sectional view along the section line XIV-XIV in FIG. 13. FIG. 14 shows the drive element 314, the drive spindle 316a, the bearing sleeves 406, the housing part 312b and the main housing G. The drive element 314 has the opening 400a with a toothing. The toothed portion 394a of the drive spindle 316a is received in the opening 400a. The toothing of the opening 400a and the toothed portion 394a are in engagement with one another, so that a torque transmission is possible.

The function of the second exemplary arrangement shown in FIGS. 12 to 14 is described below. The drive element 314 driven by the electric motor 310 and the transmission 308 rotates, this rotation of the drive element 314 being transmitted via the toothing at the openings 400a, 400b to the toothing portions 394a, 394b of the drive spindles 316a and 316b. The rotating drive spindles 316a and 316b move the actuating nuts 332a and 334b outward along the actuation axis B via the threaded portions 334a and 334b thereof in order to bring the brake shoes 112 and 114 into effective braking contact with the brake drum 100 (see FIGS. 1 to 3). During a service braking operation, the elastic element 402 keeps the contact portions 396a and 396b in contact with the wall of the recess 398 in the drive element 314. The transfer of the actuating nuts 332a, 332b and the actuation elements 304 and 306 back to the starting position takes place in the same way, although the direction of rotation with which the drive element 314 rotates is reversed. The actuating nuts 332a and 332b move with the actuation elements 304 and 306 inwardly toward the toothed portions 394a and 394b of the drive spindles 316a and 316b.

For the parking brake function, the electric motor 310 and the transmission 308 provide a higher torque with which the drive element 314 is driven. The brake shoes 112 and 114 are brought into contact with the brake drum via the actuation elements 304, 306 and the actuating nuts 332a and 332b. The actuation elements 304, 306 are thus in contact with the brake shoes 112 and 114. As a result of the high torque or a further increased torque, the threaded portions 334a and 334*b* of the drive spindles 316*a* and 316*b* are screwed out of the actuating nuts 332*a* and 332*b*. As a result, the drive spindles 316*a*, 316*b* move in the axial direction while compressing the elastic element 402 inward and thus toward one another as soon as the preloading force of the elastic element 402 is exceeded. The movement of the drive spindles 316*a* and 316*b* toward one another can take place until the projections 404*a* and 404*b* abut one another on the contact portions 396*a*, 396*b*. This axial movement of the drive spindles 316*a* and 316*b* is achieved by the axial toothing on the openings 400*a*, 400*b* and on the toothed portions 394*a*, 394*b*. The actuation unit 300 can thus be mechanically locked for the parking brake function.

The invention claimed is:

1. An electromechanical actuation unit for electromechanically actuatable motor vehicle brake, comprising:

at least one electromechanical actuation device for actuating at least one brake shoe of the motor vehicle brake, wherein the electromechanical actuation device has at least one drive element and at least one drive spindle, wherein the at least one drive element drives the at least one drive spindle, wherein the electromechanical actuation device has at least one elastic element, the at least one elastic element being elastically deformable for a parking brake function such that the elastic deformation of the at least one elastic element mechanically locks the at least one actuation device in a parking brake position and wherein a relative displacement between the at least one drive element and the at least one drive spindle is possible with elastic deformation of the at least one elastic element, wherein the at least one electromechanical actuation device has at least one stop element which has at least one externally threaded portion, and wherein the at least one stop element comprises at least one recess configured to receive a projection extending from the at least one drive element, such that the projection and recess cooperate to limit movement and enhance mechanical locking.

2. The electromechanical actuation unit according to claim 1, wherein the at least one actuation device has at least one coupling element which interacts with the elastic element for coupling the at least one drive spindle to the at least one drive element.

3. The electromechanical actuation unit according to claim 1, wherein the at least one actuation device has at least one first drive spindle and at least one second drive spindle, wherein the at least one elastic element preloads the drive spindles into the starting position thereof.

4. The electromechanically actuation unit according to claim 3, wherein the at least one first drive spindle and the second drive spindle are coupled to the drive element via a toothing so as to be rotationally fixed and displaceable in the axial direction.

5. The electromechanically actuation unit according to claim 4, wherein the at least one first drive spindle and the second drive spindle are supported in the axial direction on the drive element.

6. The electromechanical actuation unit according to claim 1, wherein the at least one drive spindle extends at least in portions in the at least one drive element.

7. The electromechanical actuation unit according to claim 1, wherein the at least one actuation device has at least one actuating nut which can be displaced in the axial direction by the at least one drive spindle.

8. The electromechanical actuation unit according to claim 1, wherein the actuation unit has at least one electric motor which has an axis of rotation that extends parallel to the actuation axis of the actuation device and wherein the actuation unit has at least one transmission which couples the actuation device to the electric motor.

9. The electromechanical actuation unit according to claim 8, wherein the at least one actuation unit has at least one housing in which the at least one actuation device and/or the at least one electric motor and/or the at least one transmission are accommodated at least in portions.

10. An electromechanically actuatable drum brake having at least one electromechanical actuation unit according to claim 1, wherein the drum brake has at least one brake drum and at least two brake shoes.

11. The electromechanically actuatable drum brake according to claim 10, wherein the drum brake has at least one anchor plate, wherein at least the electric motor is arranged on the side of the anchor plate facing away from the brake drum.

12. An electromechanical actuation unit for electromechanically actuatable motor vehicle brake, comprising:

at least one electromechanical actuation device for actuating at least one brake shoe of the motor vehicle brake, wherein the electromechanical actuation device has at least one drive element, at least one drive spindle, and at least one coupling element, wherein the at least one drive element drives the at least one drive spindle, wherein the electromechanical actuation device has at least one elastic element, the at least one elastic element being elastically deformable for a parking brake function, and wherein the at least one coupling element interacts with the elastic element for coupling the at least one drive spindle to the at least one drive element;

wherein the at least one drive spindle has at least one depression for the at least one coupling element, wherein the at least one drive element has at least one opening for receiving the at least one coupling element and wherein the at least one elastic element presses the at least one coupling element into the at least one depression.

13. The electromechanical actuation unit according to claim 5, wherein the at least one first drive spindle and the second drive spindle each have at least one axial projection, which axial projections can be brought into contact with one another by compressing the at least one elastic element.

14. The electromechanical actuation unit according to claim 12, wherein the at least one actuation device has at least one stop element which has at least one externally threaded portion.

15. An electromechanical actuation unit for electromechanically actuatable motor vehicle brake, comprising:

at least one electromechanical actuation device for actuating at least one brake shoe of the motor vehicle brake, wherein the electromechanical actuation device has at least one drive element and at least one drive spindle, wherein the at least one drive element drives the at least one drive spindle, wherein the electromechanical actuation device has at least one elastic element, the at least one elastic element being elastically deformable for a parking brake function such that the elastic deformation of the at least one elastic element mechanically locks the at least one actuation device and wherein a relative displacement between the at least one drive element and the at least one drive spindle is possible with elastic deformation of the at least one elastic element, wherein the at least one electromechanical actuation device has at least one stop element which has at least one externally threaded portion, and wherein the at least one stop element has at least one recess in which at least one projection extends on the at least one drive element, wherein the at least one actuation device has at least one first drive spindle and at least one second drive spindle, wherein the at least one elastic element preloads the at least one first and second drive spindles into the starting position thereof, and wherein the at least one first drive spindle and the second drive spindle each have at least one axial projection, which axial projections can be brought into contact with one another by compressing the at least one elastic element.

*   *   *   *   *